Aug. 25, 1936.   I. L. DUNN   2,052,389
AUTOMATIC POWER CONTROL MECHANISM
Filed May 23, 1934   2 Sheets-Sheet 1
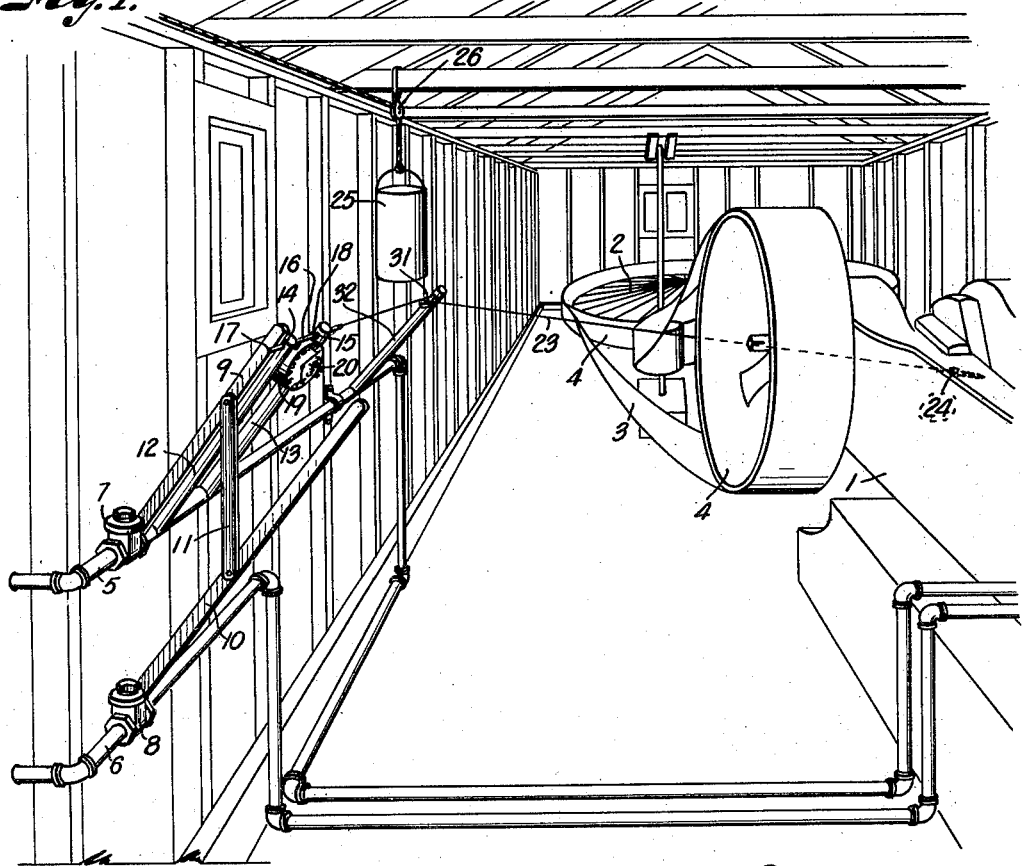
Fig. 1.
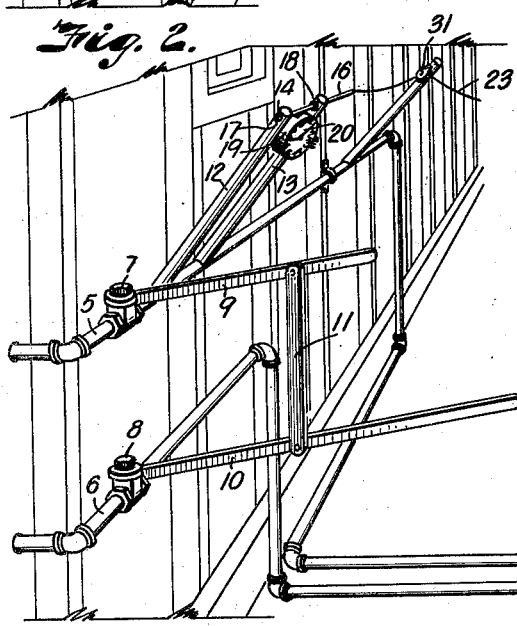
Fig. 2.
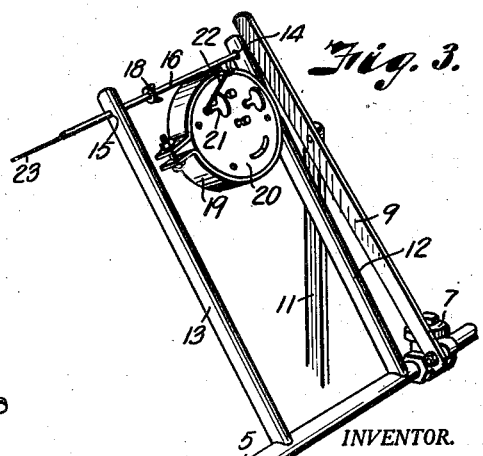
Fig. 3.
INVENTOR.
Irwin L. Dunn
BY
ATTORNEY Aug. 25, 1936.  I. L. DUNN  2,052,389

AUTOMATIC POWER CONTROL MECHANISM

Filed May 23, 1934  2 Sheets—Sheet 2

INVENTOR.
Irwin L. Dunn
BY
ATTORNEY.

Patented Aug. 25, 1936

2,052,389

UNITED STATES PATENT OFFICE 2,052,389

AUTOMATIC POWER CONTROL MECHANISM

Irwin L. Dunn, Tulsa, Okla.

Application May 23, 1934, Serial No. 727,103

3 Claims. (Cl. 192—129)

My invention relates to automatic power control mechanism and, while adaptable for automatically turning on or off steam, gas or other fluid supply to or from an engine under time or fluid level control, belt displacement or other contingency, is particularly useful, and here illustrated, as adapted for shutting down a power unit of conventional type for operating a plurality of well pumping mechanisms through cut-off of gas supply and simultaneous cut-off of cooling water supply to the engine of the power unit.

In oil fields of low production the wells are pumped intermittently for periods only sufficient to exhaust accumulations in the wells, and in some fields of large production, subject to proration laws, only for sufficient periods to produce allotments for the wells. In such operations it is customary for an attendant to turn on the power and, after the wells have pumped for their allotted periods, turn off the power by the usual manual operations. In order, however, to avoid the necessity for attendance at the power unit at the shutting-off period, it is the object of my invention to provide automatic mechanisms for shutting off the power either under time control, float control, or otherwise; and further to effect actuation of the shut-off in the event of displacement of the power belt or other exigency.

In accomplishing these and other objects of the invention I have provided improved details of structure, the preferred forms of which are illustrated in the accompanying drawings, wherein:

Fig. 1 is a detail perspective view of a power control mechanism embodying my invention, illustrated as applied to a pumping unit and operable under time or liquid level control, or by a displaced bolt, showing the control mechanism in set position.

Fig. 2 is a detail perspective view of the control mechanism in released position.

Fig. 3 is an enlarged detail perspective view of the control mechanism.

Figure 4:
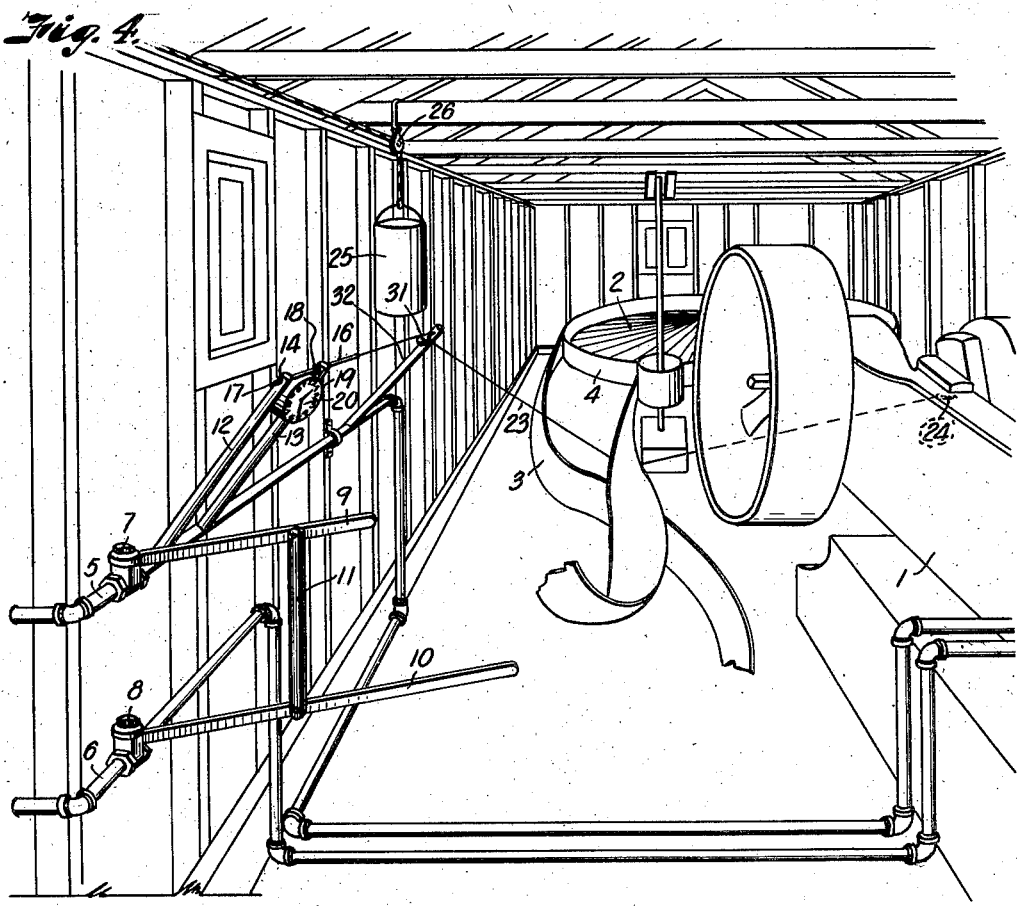
Fig. 4 is a perspective view of the control mechanism, illustrating its operation from a displaced belt.
Figure 5:
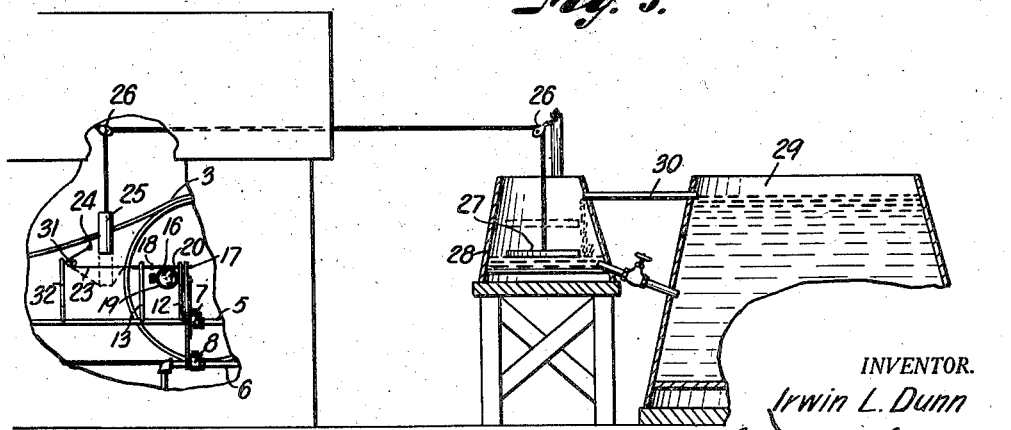
Fig. 5 is an elevation, partly in section and broken away, illustrating the mechanism under float control.

Referring more in detail to the drawings:

1 designates an explosion engine of conventional type and 2 a power unit, also of conventional type, the latter including an ordinary power belt 3 run over the usual driving band wheel 4. The engine 1 is shown supplied with gas and cooling water through lines 5 and 6 provided with valves 7 and 8 respectively. 9 and 10 designate levers for operating the valves 7 and 8, preferably of sufficient weight to fall by gravity and thus close the valves automatically when the levers are released from the restraint hereafter described, the levers being connected by a link 11 so that the two valves are operated in unison.

Mounted adjacent the valves, preferably on one of the lines 5 or 6, is a pair of arms 12 and 13 provided with registering apertures 14 and 15 in which is slidably mounted a trip rod 16 having an end 17 projected into the path of one of the valve levers to support said levers in open valve position, a stop 18 on the rod being engageable with one of the arms to limit sliding travel of the rod. Mounted on one of the arms 12 or 13, by a clamp band 19 or the like, is a time mechanism 20, preferably consisting of an alarm clock of conventional type provided with the usual alarm winding stem 21. Fixed to the stem and to the trip rod 16 is a cable 22 adapted for winding on the stem to withdraw the rod from lever supporting position when the alarm mechanism is in operation.

With the mechanism constructed and arranged as described, the valves are opened to supply gas and cooling water to the engine for operating the pumping unit, and the alarm mechanism is set for release at the end of any time period required for pumping the wells of the oil accumulated therein during idle period of the pumping unit, or for a sufficient period to produce a determined quantity of oil from the wells. When the alarm mechanism is released at the end of such determined time period the cable 22 winds on the stem 21, withdrawing the trip rod from beneath the supported lever arm and thereby permitting the lever arms to fall by gravity and shut off the gas and water supply lines, thus discontinuing the pumping operation and avoiding waste of water. The unit then remains idle until the mechanism is reset for another pumping operation.

If it is desired to release the valve levers under float control, a line 23 may be connected with the trip rod 16 and suitably anchored, as at 24, to extend the line below a weight 25, run over pulleys 26 to suspend a float 27 in a tank 28 to which oil, being pumped by the power unit, is delivered from the wells; the tank 28 being preferably auxiliary to a primary tank 29 to run oil from the primary tank to the float tank through a line 30 so that the float may operate without disturbance from agitation by oil being pumped into the main tank. The line 23 may be run over one or more pulleys 31 on standards or direction posts 32.

With this arrangement when the primary storage tank has reached a determined level, oil will pass therefrom to the float tank to lift the float and permit the weight 25 to lower onto the trip line to withdraw the trip rod from its lever support and permit the lever to drop by gravity for closing the valves.

The trip line 23 may be extended between runs of the belt 3 so that, should the belt become displaced, it will drop on the line and pull the line to trip the levers.

While I have described certain specific uses of the power control mechanism, this has been merely for illustration and without intent to restrict the invention to such use; it being apparent that the mechanism may include but a single lever for a steam or other line instead of the double lever here illustrated; that the second lever may control the valve of a line for supplying fuel to a preheater for compressed air employed in a steam engine; that an additional lever may be added for opening a line for draining the radiator of a gas engine, and that other devices may be actuated by the single control mechanism without departing from the spirit of the invention.

What I claim and desire to secure by Letters Patent is:

1. In combination with a prime mover having a driving pulley, a belt having runs operated by said pulley, means for shutting down the prime mover, a trip mechanism connected with said shutting down means, and a flexible cable extending between the runs of said belt and connected with the trip mechanism for shutting down the prime mover upon throw-off of the belt.

2. In combination with a prime mover having a driving pulley, a belt having runs operated by said pulley, means for shutting down the prime mover, a trip mechanism connected with said shutting down means, a flexible cable extending between the runs of said belt and connected with the trip mechanism for shutting down the prime mover upon throw-off of the belt, and means engageable with said flexible cable for actuating said trip mechanism independently of the belt.

3. In combination with a prime mover having a driving pulley, a belt having runs operated by said pulley, means for shutting down the prime mover, a trip mechanism connected with said shutting down means, a flexible cable extending between the runs of said belt and connected with the trip mechanism for shutting down the prime mover upon throw-off of the belt, and a timing mechanism engageable with said flexible cable for actuating said trip mechanism independently of the belt.

IRWIN L. DUNN.